US012767741B2

(12) United States Patent
Wang et al.

(10) Patent No.: US 12,767,741 B2
(45) Date of Patent: Oct. 20, 2026

(54) FILM MADE FROM C2C3C4 TERPOLYMER—C3C4 COPOLYMER BLEND AND C2C3C4 TERPOLYMER—C3C4 COPOLYMER BLEND

(71) Applicant: Borealis AG, Vienna (AT)

(72) Inventors: Jingbo Wang, Linz (AT); Markus Gahleitner, Linz (AT); Klaus Bernreitner, Linz (AT); Pauli Leskinen, Porvoo (FI); Peter Niedersüss, Linz (AT); Stefan Ortner, Linz (AT)

(73) Assignee: Borealis AG, Vienna (AT)

( * ) Notice: Subject to any disclaimer, the term of this patent is extended or adjusted under 35 U.S.C. 154(b) by 624 days.

(21) Appl. No.: 18/272,898

(22) PCT Filed: Jan. 31, 2022

(86) PCT No.: PCT/EP2022/052216
§ 371 (c)(1),
(2) Date: Jul. 18, 2023

(87) PCT Pub. No.: WO2022/167368
PCT Pub. Date: Aug. 11, 2022

(65) Prior Publication Data
US 2024/0101735 A1 Mar. 28, 2024

(30) Foreign Application Priority Data
Feb. 2, 2021 (EP) .................................... 21154802

(51) Int. Cl.

| | |
|---|---|
| ***C08F 210/06*** | (2006.01) |
| ***C08F 210/08*** | (2006.01) |
| ***C08F 210/16*** | (2006.01) |
| ***C08J 5/18*** | (2006.01) |
| ***C08L 23/0807*** | (2025.01) |
| ***C08L 23/12*** | (2006.01) |

(52) U.S. Cl.
CPC .......... *C08F 210/06* (2013.01); *C08F 210/16* (2013.01); *C08J 5/18* (2013.01); *C08L 23/0815* (2013.01); *C08L 23/12* (2013.01); *C08F 210/08* (2013.01); *C08F 2500/12* (2013.01); *C08F 2500/27* (2021.01); *C08F 2500/34* (2021.01); *C08F 2500/36* (2021.01); *C08J 2323/14* (2013.01); *C08J 2323/16* (2013.01); *C08L 2203/16* (2013.01)

(58) Field of Classification Search
CPC .... C08F 210/06; C08F 210/02; C08F 210/16; C08F 210/08; C08L 23/10; C08L 23/14; C08L 23/142; C08L 2205/02; C08L 2205/025; C08J 5/18; C08J 2323/14
See application file for complete search history.

(56) References Cited

U.S. PATENT DOCUMENTS 6,388,040 B1 5/2002 Fujita
2009/0292076 A1* 11/2009 Miyaguchi ................ C08J 5/18
525/240

FOREIGN PATENT DOCUMENTS

| | | | |
|---|---|---|---|
| CN | 110072897 | A | 7/2019 |
| EP | 0887379 | B1 | 12/2004 |
| EP | 3192817 | A1 | 7/2017 |
| EP | 3620486 | A1 | 3/2020 |
| JP | 2000136274 | A | 5/2000 |
| WO | 9212182 | A1 | 7/1992 |
| WO | 9414856 | A1 | 7/1994 |
| WO | 9512622 | A1 | 5/1995 |
| WO | 9924478 | A1 | 5/1999 |
| WO | 9924479 | A1 | 5/1999 |
| WO | 0068315 | A1 | 11/2000 |
| WO | 200202576 | A1 | 1/2002 |
| WO | 2002057342 | A2 | 7/2002 |
| WO | 2004000899 | A1 | 12/2003 |
| WO | 2004111095 | A1 | 12/2004 |
| WO | 2006097497 | A1 | 9/2006 |
| WO | 2007116034 | A1 | 10/2007 |
| WO | 2009019169 | A1 | 2/2009 |
| WO | 2011076780 | A1 | 6/2011 |
| WO | 2012001052 | A3 | 3/2012 |
| WO | 2012084961 | A1 | 6/2012 |
| WO | 2011135004 | A3 | 10/2012 |
| WO | 2013007650 | A1 | 1/2013 |
| WO | 2015158790 | A2 | 10/2015 |
| WO | 2018122134 | A1 | 7/2018 |
| WO | 2020064190 | A1 | 4/2020 |

OTHER PUBLICATIONS

International Search Report and Written Opinion for International Paten Application No. PCT/EP2022/052216 mailed May 6, 2022, 13 pages.
European Extended Search Report for European Patent Application No. 21154802.9 dated Aug. 6, 2021, 5 pages.
Chemical Reviews 2000, 100(4), pp. 1316 to 1327.
Klimke, et al., "Optimisation and Application of Polyolefin Branch Quantification by Melt-State 13C NMR Spectroscopy," Macromolecular Chemistry and Physics, vol. 207, 2006, pp. 382-395.
Parkinson, et al., "Effect of Branch Length on 13C NMR Relaxation Properties in Moten Poly[ethylene-co-(x-olefin)] Model Systems," Macromolecular Chemistry and Physics, vol. 208, 2007, pp. 2128-2133.
Pollard, et al., "Observation of Chain Branching in Polyethylene in the Solid State and Melt via 13C NMR Spectroscopy and Melt NMR Relaxation Time Measurements," Macromolecules, vol. 37, 2004, pp. 813-825.
Filip, et al., "Heteronuclear decoupling under fast MAS by a rotor-synchronized Hahn-echo pulse train," Journal of Magnetic Resonance, vol. 176, 2005, pp. 239-243.

(Continued)

*Primary Examiner* — Jeffrey S Lenihan
(74) *Attorney, Agent, or Firm* — Lowenstein Sandler LLP

(57) ABSTRACT

Film made from ethylene-propylene-1-butene terpolymer and propene-butene copolymer blend and ethylene-propylene-1-butene terpolymer and propene-butene copolymer blend.

13 Claims, No Drawings

(56) References Cited

OTHER PUBLICATIONS

Griffin, et al., "Low-load Rotor-Synchronised Hahn-echo Pulso Train (RS-HEPT) 1H Decoupling in Solid-State NMR: factors affecting MAS Spin-echo Dephasing Times",. Magnetic Resonance in Chemistry, 2007; 45: S198-S208.

Castignolles, et al., "Detection and Quantification of Branching in Polyacrylates by Size-Chromatography (SEC) and Melt-State 13c NMR Specroscopy," Polymer 50, 2009, pp. 2373-2383.

Resconi, et al., "Selectivity in Propene Polymerization with Metallocene Catalysts," Chem. Rev., 2000, vol. 100, pp. 1253-1345.

Brandolini, et al. "NMR Spectra of Polymers and Polymers Additives", Marcel Dekker, Inc., 2000, 660 pages.

Office Action with English translation for Chinese Patent Application No. 202280010659.8 mailed Feb. 22, 2025, 14 pages.

* cited by examiner

FILM MADE FROM C2C3C4 TERPOLYMER—C3C4 COPOLYMER BLEND AND C2C3C4 TERPOLYMER—C3C4 COPOLYMER BLEND

CROSS-REFERENCE TO RELATED APPLICATION(S)

The present application is a national stage entry under 35 U.S.C. § 371 of International Application No. PCT/EP2022/052216, filed on Jan. 31, 2022, which claims priority to European Patent Application No. 21154802.9, filed on Feb. 2, 2021. The contents of these applications are hereby incorporated by reference in their entirety.

FIELD OF THE INVENTION

The present invention relates to a film made from a polypropylene terpolymer-copolymer blend and to polypropylene terpolymer-copolymer blends as such.

BACKGROUND

Optimization of film based on polypropylene (PP) is a multi-dimensional problem. Many attempts have been made for optimizing the materials suitable for film. A number of upgrading components have been considered. Among these components, propylene 1-butene random copolymers may be mentioned since a number of these components fulfil FDA title 21, parts 170 to 189, FCN (food contact notification) and EU Directive 2002/72/EC.

WO 2002/057342 A1 describes a biaxially oriented PP (BOPP) film made from Ziegler-Natta derived copolymers comprising at least 0.8 wt.-% ethylene, particularly 0.8 to 1.5 wt.-%. Although terpolymers are prophetically mentioned, such materials were never made.

WO 2009/019169 A1 describes a process for providing Ziegler-Natta derived PP terpolymers suitable for blown film comprising at least 8 wt.-% of total comonomer with the comonomer units being derived from ethylene and C4 to C8 alpha olefins by way of using 1,3-diether internal donor catalyst. According to WO 2009/019169 A1, an optimal balance of properties shall be observed when an ethylene content of lower than 2.5 wt. % is combined with a butene-1 content of higher than 10 wt. %, whereby alternatively when ethylene content is higher than 2.5 wt. %, butene content should be lower than 10 wt.-%. A composition having an ethylene content of 1.2 wt.-% and 11.3 wt.-% butene, i.e. a C4/C2 (wt/wt) ratio of 9.4 resulted in a SIT of 107.4° C. and 0.2% haze (1 mm plaque).

EP 3192817 A1 discloses a method for providing a PP terpolymer including units derived from 1-butene using a crosslinked metallocene compound. EP 3192817 A1 defines ultra-broad ranges as to the structural units derived from 1-butene, namely 4 mol % to 45 mol %, and structural units derived from ethylene 4 mol % up to 45 mol % with exemplified amounts of 12.8 mol % ethylene and 21.1 mol % butene. Although EP 3192817 A1 has proposed films, but films actually were never made.

There is thus a need for PP resins and films having a low sealing initation temperature of below 106° C., good tear properties, and also good dart drop impact (DDI) relative to the stiffness as well as an acceptable haze of below 3.5%.

These aspects are addressed in the present invention, which is based on the finding that a favorable combination of DDI and stiffness, haze and sealing properties can be provided when the amounts of ethylene units, butene units, their ratio and total amount as well as the 2.1 regioinversions are carefully tailored in a base resin and a propylene 1-butene random copolymer having a melting temperature of 70 to 90° C. at a melt flow rate ($MFR_2$) in the range of 1.0 to 18.0 g/10 min.

SUMMARY OF THE INVENTION

The present invention insofar provides a film made from a blend obtainable by compounding an ethylene-propylene-1-butene terpolymer base resin and a propylene butene random copolymer upgrading resin, whereby the ethylene-propylene-1-butene terpolymer base resin includes a) units derived from ethylene in an amount of 0.1 to 2.0 wt.-%, preferably 0.5 to 1.9 wt.-% with respect the total ethylene-propylene-1-butene terpolymer base resin; and b) units derived from propylene in an amount of 88.0 to 95.9 wt.-%, preferably 90.1 to 95.0 wt.-% with respect the total ethylene-propylene-1-butene terpolymer base resin; and c) units derived from butene in an amount of 4.0 to 10.0 wt.-%, preferably 4.5 to 8.0 wt.-% with respect the total ethylene-propylene-1-butene terpolymer base resin, d) whereby the units derived from ethylene, propylene and butene add up to 100 wt.-%, and e) preferably a total amount of units derived from ethylene and butene of 6.0 to 9.0 wt.-% with respect the total ethylene-propylene-1-butene terpolymer base resin, and f) preferably a ratio of the units derived from butene in weight percent versus the units derived from ethylene in weight percent of 3.0 to 16.0, more preferably 3.0 to 8.0;

whereby the ethylene-propylene-1-butene terpolymer base resin has g) 2.1 regioinversions in an amount of 0.10 to 0.80 mol %, preferably 0.20 to 0.50 mol %, as determined by $^{13}C$-NMR analysis (as described in the experimental part); and h) a melt flow rate $MFR_2$ (230° C./2.16 kg) measured according to ISO 1133 in the range from 1.0 to 18.0 g/10 min, and preferably 1.5 to 7.0 g/10 min, and i) a melting temperature Tm measured by differential scanning calorimetry (DSC) in the range from 123 to 142° C., preferably 125 to 135° C.; and j) preferably a xylene cold soluble (XCS) content of 5.0 to 25.0 wt.-% more preferably 15.0 to 19.0 wt.-% determined at 25° C. according ISO 16152; 2005; and whereby the propylene butene random copolymer upgrading resin has k) a melting temperature Tm measured by differential scanning calorimetry (DSC) in the range from 70 to 90° C., and l) units derived from butene in an amount of 20.0 to 35.0 wt.-%, preferably 22.0 to 29.0 wt.-% with respect the total propylene butene random copolymer upgrading resin, m) whereby the units derived from propylene and butene add up to 100 wt.-%, and n) a melt flow rate $MFR_2$ (230° C./2.16 kg) measured according to ISO 1133 of 1.0 to 18.0 g/10 min and preferably higher than the melt flow rate $MFR_2$ (230° C./2.16 kg) of the base resin; and o) optionally an elongation at break (ASTM D638) of 100 to 900%, usually 200 to 500%, and whereby the film has a sealing initiation temperature (SIT) (as determined by a method described in the experimental part) below 106° C., preferably from 80 to below 106° C.

Particularly, the present invention provides a film made from a blend obtainable by compounding an ethylene-propylene-1-butene terpolymer base resin and a propylene butene random copolymer upgrading resin, whereby the ethylene-propylene-1-butene terpolymer base resin includes a) units derived from ethylene in an amount 0.5 to 1.9 wt.-% with respect the total ethylene-propylene-1-butene terpolymer base resin; and b) units derived from propylene in an amount of 90.1 to 95.0 wt.-% with respect the total ethylene-propylene-1-butene terpolymer base resin; and c) units derived from butene in an amount of 4.5 to 8.0 wt.-% with respect the total ethylene-propylene-1-butene terpolymer base resin, d) whereby the units derived from ethylene, propylene and butene add up to 100 wt.-%, and e) a total amount of units derived from ethylene and butene of 6.0 to 9.0 with respect the total ethylene-propene-butene terpolymer base resin, and f) a ratio of the units derived from butene in weight percent versus the units derived from ethylene in weight percent of 3.0 to 16.0, more preferably 3.0 to 8.0;

whereby the ethylene-propylene-1-butene terpolymer base resin has g) 2.1 regioinversions in an amount of 0.20 to 0.50 mol % as determined by $^{13}$C-NMR analysis (as described in the experimental part); and h) a melt flow rate $MFR_2$ (230° C./2.16 kg) measured according to ISO 1133 in the range from 1.5 to 7.0 g/10 min, and i) a melting temperature Tm measured by differential scanning calorimetry (DSC) in the range from 125 to 135° C.; and j) preferably a xylene cold soluble (XCS) content of 5.0 to 25.0 wt.-%, more preferably 15.0 to 19.0 wt.-% determined at 25° C. according ISO 16152; 2005 and whereby the propylene butene random copolymer upgrading resin has k) a melting temperature Tm measured by differential scanning calorimetry (DSC) in the range from 70 to 90° C., and l) units derived from butene in an amount of 20.0 to 35.0 wt.-%, preferably 22.0 to 29.0 wt.-% with respect the total propylene butene random copolymer upgrading resin, and m) whereby the units derived from propylene and butene add up to 100 wt.-%, and n) a melt flow rate $MFR_2$ (230° C./2.16 kg) measured according to ISO 1133 in the range of 1.0 to 18.0 g/10 min and preferably higher than the melt flow rate $MFR_2$ (230° C./2.16 kg) of the base resin; and o) optionally an elongation at break (ASTM D638) of 100 to 900% usually from 200 to 500%, and whereby the film has a sealing initiation temperature (SIT) (as determined by a method described in the experimental part) below 106° C., preferably from 80 to below 106° C.

In another aspect the present invention provides a blend obtainable by compounding an ethylene-propylene-1-butene terpolymer base resin and a propylene butene random copolymer upgrading resin, whereby the ethylene-propylene-1-butene terpolymer base resin includes a) units derived from ethylene in an amount of 0.1 to 2.0 wt.-%, preferably 0.5 to 1.9 wt.-% with respect the total ethylene-propylene-1-butene terpolymer base resin; and b) units derived from propylene in an amount of 88.0 to 95.9 wt.-%, preferably 90.1 to 95.0 wt.-% with respect the total ethylene-propylene-1-butene terpolymer base resin; and c) units derived from butene in an amount of 4.0 to 10.0 wt.-%, preferably 4.5 to 8.0 wt.-% with respect the total ethylene-propylene-1-butene terpolymer base resin, d) whereby the units derived from ethylene, propylene and butene add up to 100 wt.-%, and e) preferably a total amount of units derived from ethylene and butene of 6.0 to 9.0 with respect the total ethylene-propylene-1-butene terpolymer base resin, and f) preferably a ratio of the units derived from butene in weight percent versus the units derived from ethylene in weight percent of 3.0 to 16.0, more preferably 3.0 to 8.0;

whereby the ethylene-propylene-1-butene terpolymer base resin has g) 2.1 regioinversions in an amount of 0.10 to 0.80 mol %, preferably 0.20 to 0.50 mol %, as determined by $^{13}$C-NMR analysis (as described in the experimental part); and h) a melt flow rate $MFR_2$ (230° C./2.16 kg) measured according to ISO 1133 in the range from 1.0 to 18.0 g/10 min, and preferably 1.5 to 7.0 g/10 min, and i) a melting temperature Tm measured by differential scanning calorimetry (DSC) in the range from 123 to 142° C., preferably 125 to 135° C.; and j) preferably a xylene cold soluble (XCS) content of 5.0 to 25.0 wt.-% more preferably 15.0 to 19.0 wt.-% determined at 25° C. according ISO 16152; 2005;

and whereby the propylene butene random copolymer upgrading resin has k) a melting temperature Tm measured by differential scanning calorimetry (DSC) in the range from 70 to 90° C., and l) units derived from butene in an amount of 20.0 to 35.0 wt.-%, preferably 22.0 to 29.0 wt.-% with respect the total propylene butene random copolymer upgrading resin, m) whereby the units derived from propylene and butene add up to 100 wt.-%, and n) a melt flow rate $MFR_2$ (230° C./2.16 kg) measured according to ISO 1133 in the range of 1.0 to 18.0 g/10 min and preferably higher than the melt flow rate $MFR_2$ (230° C./2.16 kg) of the base resin; and o) optionally an elongation at break (ASTM D638) of 100 to 900%, usually from 200 to 500%.

In yet a further aspect the present invention provides a blend obtainable by compounding an ethylene-propylene-1-butene terpolymer base resin and a propylene butene random copolymer upgrading resin, whereby the ethylene-propylene-1-butene terpolymer base resin includes a) units derived from ethylene in an amount 0.5 to 1.9 wt.-% with respect the total ethylene-propylene-1-butene terpolymer base resin; and b) units derived from propylene in an amount of 90.1 to 95.0 wt.-% with respect the total ethylene-propylene-1-butene terpolymer base resin; and c) units derived from butene in an amount of 4.5 to 8.0 wt.-% with respect the total ethylene-propylene-1-butene terpolymer base resin, d) whereby the units derived from ethylene, propylene and butene add up to 100 wt.-%, and e) a total amount of units derived from ethylene and butene of 6.0 to 9.0 with respect the total ethylene-propylene-1-butene terpolymer base resin, and f) a ratio of the units derived from butene in weight percent versus the units derived from ethylene in weight percent of 3.0 to 16.0, more preferably 3.0 to 8.0;

whereby the ethylene-propene-butene terpolymer base resin has g) 2.1 regioinversions in an amount of 0.20 to 0.50 mol % as determined by $^{13}C$-NMR analysis (as described in the experimental part); and h) a melt flow rate $MFR_2$ (230° C./2.16 kg) measured according to ISO 1133 in the range from 1.5 to 7.0 g/10 min, and i) a melting temperature Tm measured by differential scanning calorimetry (DSC) in the range from 125 to 135° C.; and j) preferably a xylene cold soluble (XCS) content of 15.0 to 19.0 wt.-% determined at 25° C. according ISO 16152; 2005;

and whereby the propylene butene random copolymer upgrading resin has k) a melting temperature Tm measured by differential scanning calorimetry (DSC) in the range from 70 to 90° C., and l) units derived from butene in an amount of 22.0 to 29.0 wt.-% with respect the total propylene butene random copolymer upgrading resin, m) whereby the units derived from propylene and butene add up to 100 wt.-%, and n) a melt flow rate $MFR_2$ (230° C./2.16 kg) measured according to ISO 1133 in the range of 1.0 to 18.0 g/1 min and preferably higher than the melt flow rate $MFR_2$ (230° C./2.16 kg) of the base resin; and o) optionally an elongation at break (ASTM D638) of 100 to 900%, usually from 200 to 500%.

Definitions

"Upgrading resin" merely means a further resin, i.e. a further resin being present in addition to the base resin. Thus, the term "propylene butene random copolymer upgrading resin" as used in the claims is with a "propylene butene random copolymer resin". In other words, the term "upgrading" is only present for illustrative purposes The regio-defects of propylene polymers can be of three different types, namely 2,1-erythro (2,1e), 2,1-threo (2,1t) and 3,1 defects. A detailed description of the structure and mechanism of formation of regio defects in polypropylene can be found for example in Chemical Reviews 2000, 100(4), pages 1316 to 1327. These defects are measured using $^{13}C$-NMR spectroscopy as described in more detail below.

The term "2,1 regio defects" or "2.1 regioinversions" as used in the present invention defines the sum of 2,1-erythro regio-defects and 2,1-threo regio defects.

The "terpolymer" according to the present invention denotes a polymer made of the monomers ethylene, propylene and 1-butene, whereby these monomers can be found in the polymer chain. The weight-content of units originating from these monomers adds up to 100 wt.-%. Pseudo terpolymers being made from mixtures of two copolymers do not subsume under the term "terpolymer" according to the present invention. Pseudo terpolymers can be recognized by coupled TREF-IR, coupled TREF-NMR or similar methods. As a matter of definition, a terpolymer according to the present invention is not a mixture of two copolymers.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Bimodal as to the units derived from butene means that the terpolymer is obtainable in two reactors coupled in series at a split ratio of within 40:60 to 60:40, whereby these reactors are operated such that the intermediate terpolymer being produced in the first reactor differs from the final terpolymer as to the content of units derived from butene by at least 20%, for example 5.0 wt.-% (first reactor) and 6.0 wt.-% (final).

Bimodal as to the molecular weight means that the terpolymer is obtainable in two reactors coupled in series at a split ratio of within 40:60 to 60:40, whereby these reactors are operated such that the intermediate terpolymer being produced in the first reactor differs from the final terpolymer as to the melt flow rate (ISO 1133, 2.16 kg load, 230° C.) by at least 20%, for example 1.5 g/10 min (first reactor) and 1.8 g/10 min (final).

Preferred Aspects

The film according to present invention is preferably made by blending a propylene butene random copolymer upgrading resin which has one or more, preferably all of the following:

a) a tensile strength at break (ASTM D638) of at least 15 MPa, preferably 16 to 39 MPa, b) a tensile modulus (according to ASTM D638) of least 200 MPa, preferably 210 to 450 MPa;

c) a shore D hardness (ASTM D2240) of at least 55; preferably 55 to 60;

d) a melting temperature Tm measured by differential scanning calorimetry (DSC) in the range from 81 to 90° C.

Propylene butene random copolymer upgrading resin having these features are commercially available inter alia from Mitsui Chemicals e.g. under the tradename Tafmer XM series.

The film according to present invention is preferably made by blending an ethylene-propylene-1-butene terpolymer base resin which has 2.1 regioinversions in an amount of 0.20 to 0.35 mol %, preferably 0.20 to 0.30 mol %, as determined by $^{13}C$-NMR analysis (as described in the experimental part). Such 2.1 regioinversions can be adjusted by using the catalyst as described in the experimental part, plus using the amounts of comonomers as recommended herein and finally adapting reaction temperature: A higher reaction temperature results in a lower content of 2.1 regioinversions.

The film according to present invention is preferably made by blending the ethylene-propylene-1-butene terpolymer base resin in an amount of 70 to 95 wt.-% with respect to the total blend and the propylene butene random copolymer upgrading resin is present in an amount of 5 to 30 wt.-% with respect to the total blend. The ethylene-propylene-1-butene terpolymer base resin and the propylene butene random copolymer upgrading resin preferably add up to at least 98 wt.-%, preferably up to 100 wt.-% of the film, i.e. the resulting film material is essentially free, more preferably entirely free of other polymer components.

The film according to the present invention is further characterized by the fact that the haze of a test film, when determined according to ASTM D1003-00 with the test film having a thickness of 50 micrometres, is below 3.5%. In other words, the film according to the present invention may have a thickness other than 50 micrometres.

The film according to the present invention is preferably made from an ethylene-propylene-1-butene terpolymer base resin being bimodal as to the C4 content and/or being bimodal as to the molecular weight.

All aspects as described above with respect to the film also hold for the blend according to the present invention.

Particularly the blend according to the present invention is made from a propylene butene random copolymer upgrading resin which has one or more, preferably all of the following parameters:

a) a tensile strength at break (ASTM D638) of at least 15 MPa, preferably 16 to 39 MPa,
b) a tensile modulus of least 200 MPa, preferably 210 to 450 MPa measured according to ASTM D638;
c) a shore D hardness (ASTM D2240) of at least 55; preferably 55 to 60;
d) a melting temperature Tm measured by differential scanning calorimetry (DSC) in the range from 81 to 90° C.

The blend according to present invention preferably is made from an ethylene-propylene-1-butene terpolymer base resin having 2.1 regioinversion in an amount of 0.20 to 0.35 mol %, preferably 0.20 to 0.30 mol %, as determined by $^{13}C$-NMR analysis (as described in the experimental part). The amount of 2.1 regioinversions can be described as outlined above.

The blend according to the present invention includes the ethylene-propylene-1-butene terpolymer base resin in an amount of 70 to 95 wt.-% with respect to the total blend and the propylene butene random copolymer upgrading resin in an amount of 5 to 30 wt.-% with respect to the total blend. Preferably the ethylene-propylene-1-5 butene terpolymer base resin and propylene butene random copolymer upgrading resin add up to at least 98 wt.-%, more preferably to 100 wt.-% of the total blend. Thus, the blend is essentially free of other polymeric components, preferably entirely free of polymeric components.

The blend according to the present invention is preferably obtained from the ethylene-propylene-1-butene terpolymer base resin being bimodal as to the units derived from butene and/or bimodal as to the molecular weight.

Two specifically preferred embodiments shall be described in the following.

A first particularly preferred blend is obtainable by compounding an ethylene-propylene-1-butene terpolymer base resin and a propylene butene random copolymer upgrading resin, whereby the ethylene-propylene-1-butene terpolymer base resin includes a) units derived from ethylene in an amount 0.5 to 1.9 wt.-% with respect the total ethylene-propylene-1-butene terpolymer base resin; and
b) units derived from propylene in an amount of 90.1 to 95.0 wt.-% with respect the total ethylene-propylene-1-butene terpolymer base resin; and
c) units derived from butene in an amount of 4.5 to 8.0 wt.-% with respect the total ethylene-propylene-1-butene terpolymer base resin,
d) whereby the units derived from ethylene, propylene and butene add up to 100 wt.-%, and
e) a total amount of units derived from ethylene and butene of 6.0 to 9.0 wt.-% with respect the total ethylene-propylene-1-butene terpolymer base resin, and
f) a ratio of the units derived from butene in weight percent versus the units derived from ethylene in weight percent of 3.0 to 16.0, more preferably 3.0 to 8.0;

whereby the ethylene-propylene-1-butene terpolymer base resin has g) 2.1 regioinversions in an amount of 0.20 to 0.50 mol % as determined by $^{13}C$-NMR analysis (as described in the experimental part); and
h) a melt flow rate $MFR_2$ (230° C./2.16 kg) measured according to ISO 1133 in the range from 1.5 to 7.0 g/10 min, and
i) a melting temperature Tm measured by differential scanning calorimetry (DSC) in the range from 125 to 135° C.; and
j) preferably a xylene cold soluble (XCS) content of 5.0 to 25.0 wt.-% more preferably 15.0 to 19.0 wt.-% determined at 25° ° C. according ISO 16152; 2005 and whereby the propylene butene random copolymer upgrading resin has k) a melting temperature Tm measured by differential scanning calorimetry (DSC) in the range from 70 to 90° C., and
l) units derived from butene in an amount of 22.0 to 29.0 wt.-% with respect the total propylene butene random copolymer upgrading resin,
m) whereby the units derived from propylene and butene add up to 100 wt.-%, and
n) a melt flow rate $MFR_2$ (230° C./2.16 kg) measured according to ISO 1133 in the range of 1.0 to 18.0 g/10 min and preferably higher than the melt flow rate $MFR_2$ (230° C./2.16 kg) of the base resin; and
o) optionally an elongation at break (ASTM D638) of 100 to 900%; usually from 200 to 500%, and whereby the ethylene-propylene-1-butene terpolymer base resin is present in an amount of 85 to 95 wt.-% with respect to the total blend and whereby the propylene butene random copolymer upgrading resin is present in an amount of 5 to 15 wt.-% with respect to the total blend, whereby ethylene-propylene-1-butene terpolymer base resin and propylene butene random copolymer upgrading resin add up to at least 98 wt.-%, particularly 100 wt.-% of the total blend.

The present invention is also concerned with a film made from this this blend.

This embodiment provides moderate good SIT of below 106° C., acceptable good haze of below 3.5%, acceptable DDI at very good stiffness.

A second and more preferred blend is obtainable by compounding an ethylene-propylene-1-butene terpolymer base resin and a propylene butene random copolymer upgrading resin, whereby the ethylene-propylene-1-butene terpolymer base resin includes a) units derived from ethylene in an amount 0.5 to 1.9 wt.-% with respect the total ethylene-propene-butene terpolymer base resin; and b) units derived from propylene in an amount of 90.1 to 95.0 wt.-% with respect the total ethylene-propene-butene terpolymer base resin; and c) units derived from butene in an amount of 4.5 to 8.0 wt.-% with respect the total ethylene-propene-butene terpolymer base resin, d) whereby the units derived from ethylene, propylene and butene add up to 100 wt.-%, and e) a total amount of units derived from ethylene and butene of 6.0 to 9.0 wt.-% with respect the total ethylene-propene-butene terpolymer base resin, and f) a ratio of the units derived from butene in weight percent versus the units derived from ethylene in weight percent of 3.0 to 16.0, more preferably 3.0 to 8.0;

whereby the ethylene-propene-butene terpolymer base resin has g) 2.1 regioinversions in an amount of 0.20 to 0.50 mol % as determined by $^{13}$C-NMR analysis (as described in the experimental part); and h) a melt flow rate $MFR_2$ (230° C./2.16 kg) measured according to ISO 1133 in the range from 1.5 to 7.0 g/10 min, and i) a melting temperature Tm measured by differential scanning calorimetry (DSC) in the range from 125 to 135° C.; and j) preferabyl a xylene cold soluble (XCS) content of 5.0 to 25.0 wt.-% more preferably 15.0 to 19.0 wt.-% determined at 25° C. according ISO 16152; 2005; and whereby the propylene butene random copolymer upgrading resin has k) a melting temperature Tm measured by differential scanning calorimetry (DSC) in the range from 70 to 90° C., and l) units derived from butene in an amount of 22.0 to 29.0 wt.-% with respect the total propylene butene random copolymer upgrading resin, m) whereby the units derived from propylene and butene add up to 100 wt.-%, and n) a melt flow rate $MFR_2$ (230° C./2.16 kg) measured according to ISO 1133 in the range of 1.0 to 18.0 g/1 min, and preferably higher than the melt flow rate $MFR_2$ (230° C./2.16 kg) of the base resin; and o) optionally an elongation at break (ASTM D638) of 100 to 900%; usually from 200 to 500%, and whereby the ethylene-propylene-1-butene terpolymer base resin is present in an amount of 70 to less than 85 wt.-% with respect to the total blend and whereby the propylene butene random copolymer upgrading resin is present in an amount of more than 15 to 30 wt.-% with respect to the total blend, whereby ethylene-propylene-1-butene terpolymer base resin and propylene butene random copolymer upgrading resin add up to at least 98 wt.-%, particularly 100 wt.-% of the total blend.

The present invention is also concerned with a film made from this second particularly preferred blend.

This embodiment provides excellent SIT of below 98° C., very good haze of below 2.0%, very good DDI and good tear at a moderate stiffness.

Catalysts

A number of catalysts are suitable in the present invention for preparing the ethylene-propylene-1-butene terpolymer.

Generally, the catalyst system used in the present invention may be prepared as described in WO 2018/122134 A1. The catalyst can be used in supported or unsupported form, preferably in supported form. The particulate support material used is preferably an organic or inorganic material, such as silica, alumina or zirconia or a mixed oxide such as silica-alumina, in particular silica, alumina or silica-alumina. The use of a silica support is preferred. The skilled person is aware of the procedures required to support a metallocene catalyst.

Especially preferably, the support is a porous material so that the complex may be loaded into the pores of the support, e.g. using a process analogous to those described in WO 94/14856 (Mobil), WO 95/12622 (Borealis) and WO 2006/097497. The average particle size of the silica support can be typically from 10 to 100 μm. However, it has turned out that special advantages can be obtained if the support has an average particle size from 15 to 80 μm, preferably from 18 to 50 μm.

The average pore size of the silica support can be in the range 10 to 100 nm and the pore volume from 1 to 3 mL/g.

Examples of suitable support materials are, for instance, ES757 produced and marketed by PQ Corporation, Sylopol 948 produced and marketed by Grace or SUNSPERA DM-L-303 silica produced by AGC Si-Tech Co. Supports can be optionally calcined prior to the use in catalyst preparation in order to reach optimal silanol group content.

The use of these supports is routine in the art.

Preferred complexes of use in the invention are of formula (II') or (II)

(II')

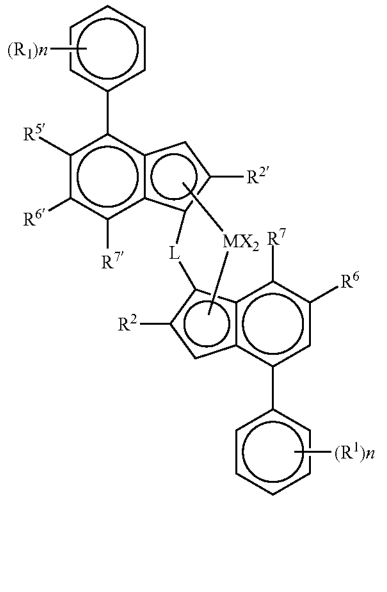

-continued (II)

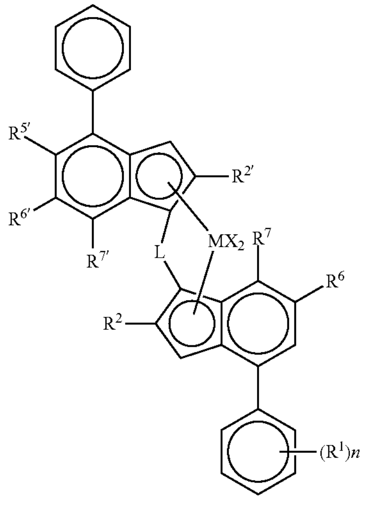

wherein M is zirconium or hafnium;

each X is independently a hydrogen atom, a halogen atom, $C_1$-6-alkoxy group, $C_1$-6-alkyl, phenyl or benzyl group;

L is a divalent bridge selected from —$R'_2C$—, —$R'_2C$—$CR'_2$—, —$R'_2Si$—, —$R'_2Si$—$SiR'_2$—, —$R'_2Ge$—, wherein each R' is independently a hydrogen atom, $C_{1-20}$-alkyl, $C_{3-10}$-cycloalkyl, tri($C_{1-20}$-alkyl)silyl, $C_{6-20}$-aryl, $C_{7-20}$-arylalkyl or $C_{7-20}$-alkylaryl;

each of $R^2$ or $R^{2'}$ is a $C_{1-10}$-alkyl group;

$R^{5'}$ is a $C_{1-10}$ alkyl group or $Z'R^{3'}$ group;

$R^6$ is hydrogen or a $C_{1-10}$-alkyl group;

$R^{6'}$ is a $C_{1-10}$-alkyl group or $C_{6-10}$-aryl group; preferably a tertiary alkyl group;

$R^7$ is hydrogen, a $C_{1-6}$-alkyl group or $ZR^3$ group and $R^{7'}$ is hydrogen;

Z and Z' are independently O or S;

$R^{3'}$ is a $C_{1-10}$-alkyl group, or a $C_{6-10}$-aryl group optionally substituted by one or more halo groups;

$R^3$ is a $C_{1-10}$-alkyl group;

each n is independently 0 to 4, e.g. 0, 1 or 2;

and each $R^1$ is independently a $C_{1-20}$-hydrocarbyl group, e.g. $C_{1-10}$-alkyl group.

Further preferred complexes of use in the invention are of formula (III') or (III):

(III')

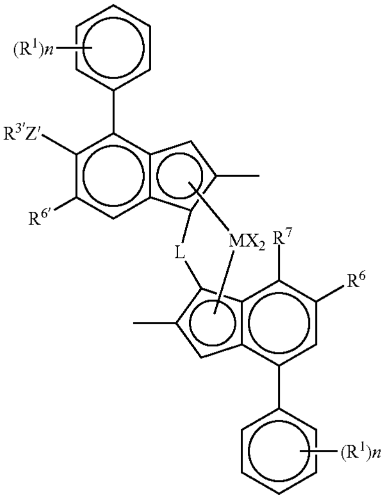

-continued (III)

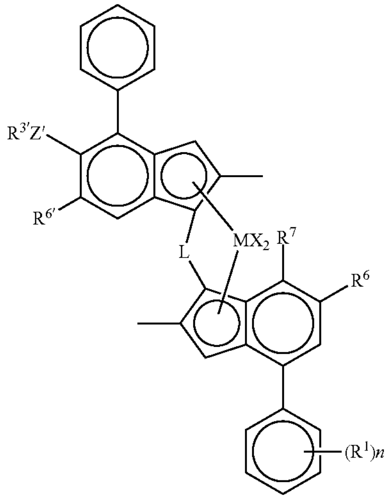

M is zirconium or hafnium;

each X is independently a hydrogen atom, a halogen atom, $C_{1-6}$-alkoxy group, $C_{1-6}$-alkyl, phenyl or benzyl group;

L is a divalent bridge selected from —$R'_2C$— or —$R'_2Si$— wherein each R' is independently a hydrogen atom, $C_{1-20}$-alkyl or $C_{3-10}$-cycloalkyl;

$R^6$ is hydrogen or a $C_{1-10}$-alkyl group;

$R^{6'}$ is a $C_{1-10}$-alkyl group or $C_{6-10}$-aryl group, preferably a tertiary alkyl group;

$R^7$ is hydrogen, $C_{1-6}$-alkyl or $OC_{1-6}$-alkyl; Z' is O or S;

$R^{3'}$ is a $C_{1-10}$-alkyl group, or $C_{6-10}$-aryl group optionally substituted by one or more halo groups;

n is independently 0 to 4, e.g. 0, 1 or 2; and each $R^1$ is independently a $C_{1-10}$-alkyl group.

Further preferred complexes of use in the invention are of formula (IV'') or (IV):

(IV')

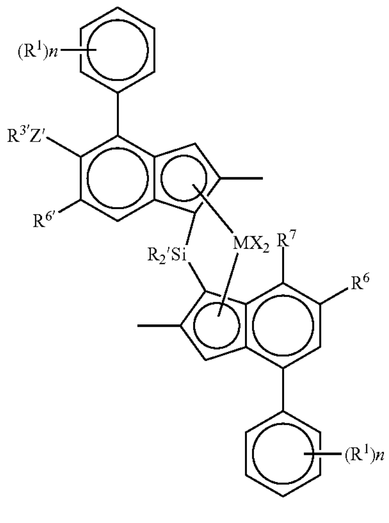

-continued (IV)

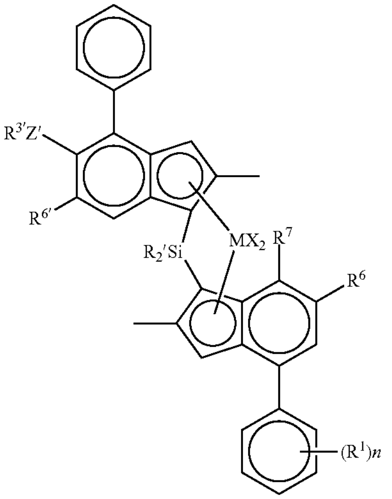

M is zirconium or hafnium;

each X is independently a hydrogen atom, a halogen atom, $C_{1-6}$-alkoxy group, $C_{1-6}$-alkyl, phenyl or benzyl group;

each R' is independently a hydrogen atom, $C_{1-20}$-alkyl or $C_{3-7}$-cycloalkyl;

$R^6$ is hydrogen or a $C_{1-10}$-alkyl group;

$R^{6'}$ is a $C_{1-10}$-alkyl group or $C_{1-10}$-aryl group, preferably a tertiary alkyl group;

$R^7$ is hydrogen, $C_{1-6}$-alkyl or $OC_{1-6}$-alkyl; Z' is O or S;

$R^{3'}$ is a $C_{1-10}$-alkyl group, or $C_{6-10}$-aryl group optionally substituted by one or more halo groups; n is independently 0, 1 to 2; and each $R^1$ is independently a $C_{3-8}$-alkyl group.

Most preferably, the complex of use in the invention is of formula (V') or (V):

(V')

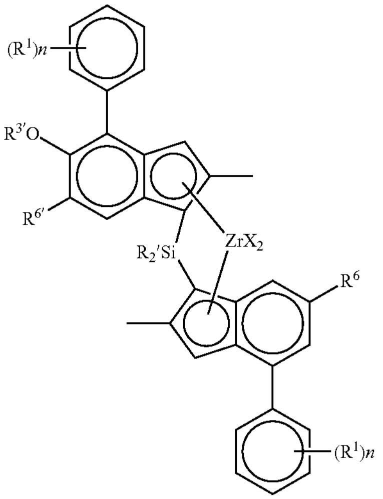

-continued (V)

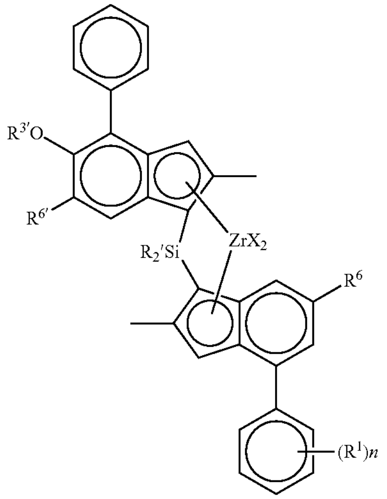

wherein each X is independently a hydrogen atom, a halogen atom, $C_{1-6}$-alkoxy group, $C_{1-6}$-alkyl, phenyl or benzyl group;

R' is independently a $C_{1-6}$-alkyl or $C_{3-10}$-cycloalkyl;

$R^1$ is independently $C_{3-8}$-alkyl;

$R^6$ is hydrogen or a $C_{3-8}$-alkyl group;

$R^{6'}$ is a $C_{3-8}$-alkyl group or $C_{6-10}$-aryl group, preferably a tertiary $C_{4-8}$-alkyl group;

$R^{3'}$ is a $C_{1-6}$-alkyl group, or $C_{6-10}$-aryl group optionally substituted by one or more halo groups; and n is independently 0, 1 or 2.

Particular compounds of the invention include:

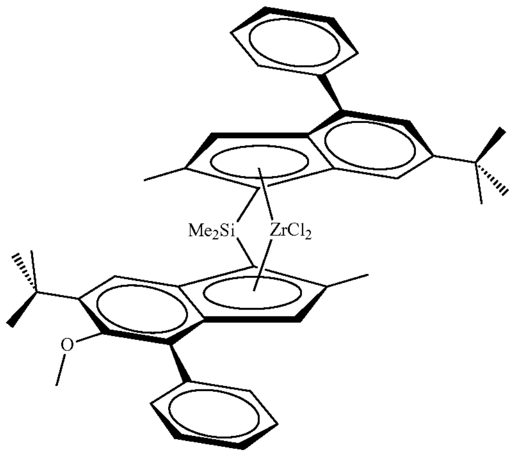

rac-anti-$Me_2Si$(2-Me-4-Ph-6-tBu-Ind)(2-Me-4-Ph-5-OMe-6-tBu-Ind)$ZrCl_2$

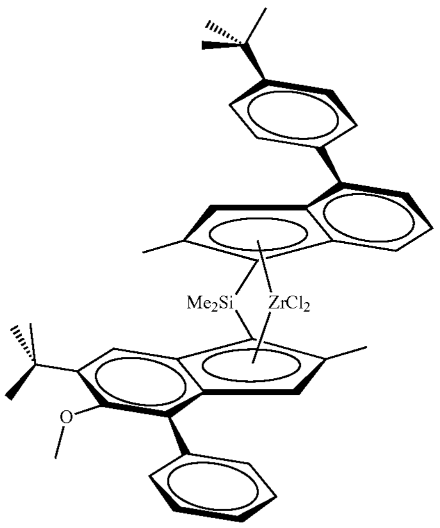
rac-anti-$Me_2Si$(2-Me-4-(p-tBuPh)-Ind)(2-Me-4-Ph-5-OMe-6-tBu-Ind)$ZrCl_2$
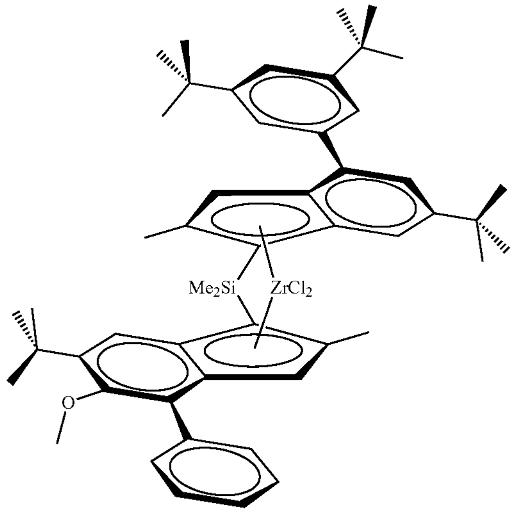
rac-anti-$Me_2Si$(2-Me-4-(3,5-di-tBuPh)-6-tBu-Ind)(2-Me-4-Ph-5-OMe-6-tBu-Ind)$ZrCl_2$
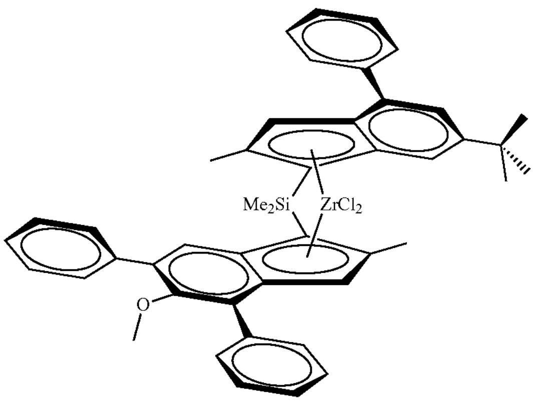
rac-anti-$Me_2Si$(2-Me-4-Ph-6-tBu-Ind)(2-Me-4,6-di-Ph-5-OMe-Ind)$ZrCl_2$
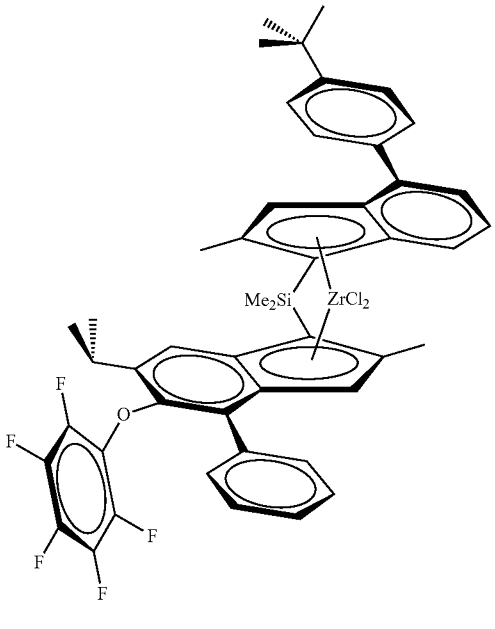
rac-anti-$Me_2Si$(2-Me-4-(p-tBuPh)-Ind)(2-Me-4-Ph-5-$OC_6F_5$)-6-iPr-Ind)$ZrCl_2$ -continued
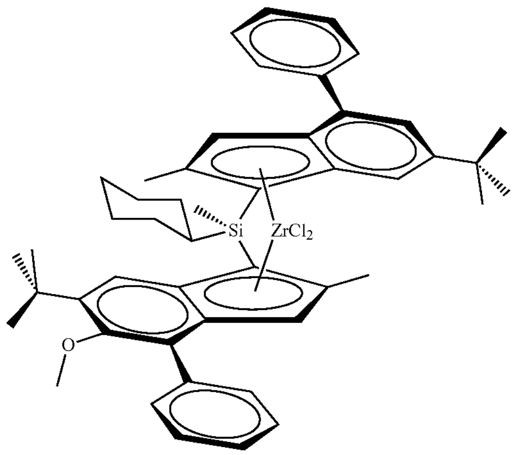
rac-anti-Me(CyHex)Si(2-Me-4-Ph-6-tBu-Ind)(2-Me-4-Ph-5-OMe-6-tBu-Ind)$ZrCl_2$
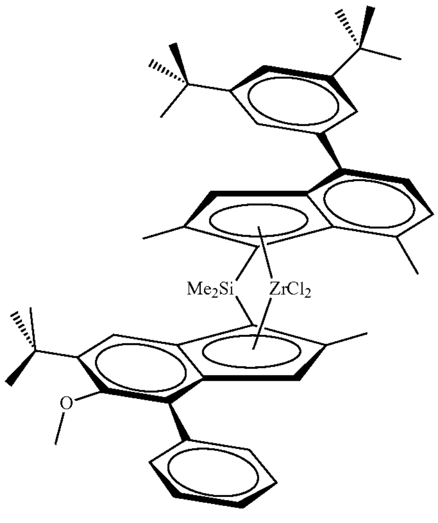
rac-anti-$Me_2Si$(2-Me-4-(3,5-di-tBuPh)-7-Me-Ind)(2-Me-4-Ph-5-OMe-6-tBu-Ind)$ZrCl_2$
-continued
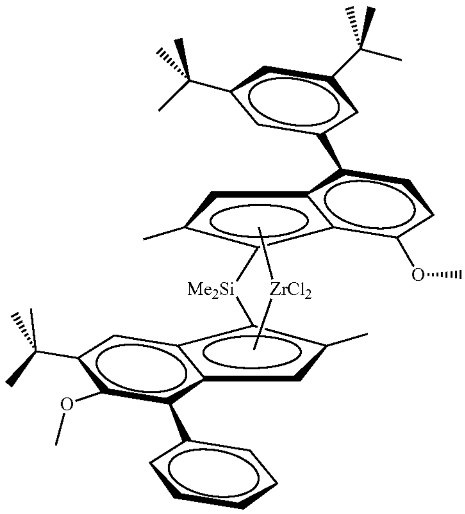
rac-anti-$Me_2Si$(2-Me-4-(3,5-di-tBuPh)-7-OMe-Ind)(2-Me-4-Ph-5-OMe-6-tBu-Ind)$ZrCl_2$
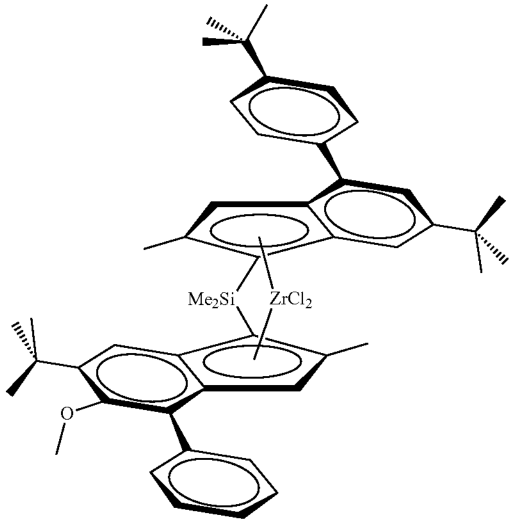
rac-anti-$Me_2Si$(2-Me-4-(p-tBuPh)-6-tBu-Ind)(2-Me-4-Ph-5-OMe-6-tBu-Ind)$ZrCl_2$ -continued

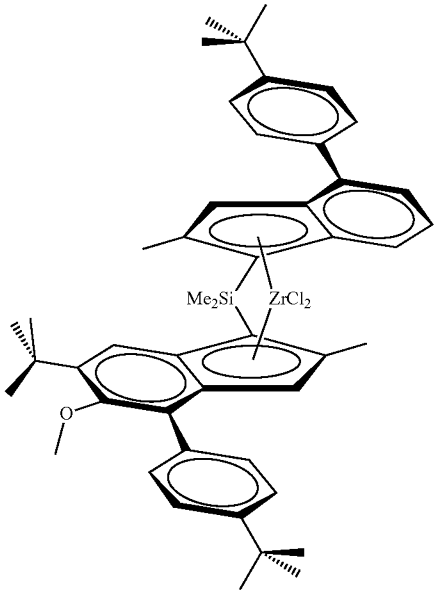

rac-anti-$Me_2Si$(2-Me-4-(p-tBuPh)-Ind)(2-Me-4-(4-tBuPh)-5-OMe-6-tBu-Ind)$ZrCl_2$

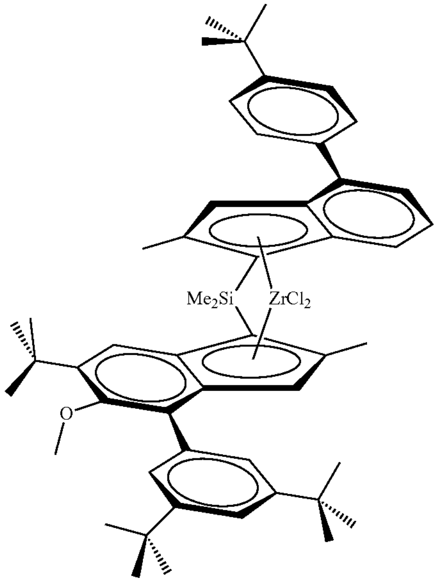

rac-anti-$Me_2Si$(2-Me-4-(p-tBuPh)-Ind)(2-Me-4-(3,5-tBu2Ph)-5-OMe-6-tBu-Ind)$ZrCl_2$ -continued

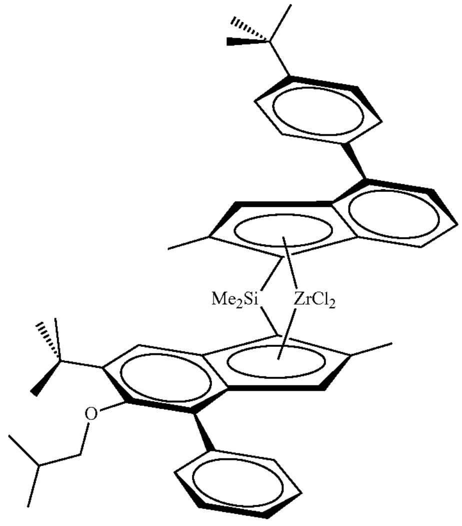

rac-anti-$Me_2Si$(2-Me-4-(p-tBuPh)-Ind)(2-Me-4-Ph-5-OiBu-6-tBu-Ind)$ZrCl_2$

Most preferably rac-anti-$Me_2Si$(2-Me-4-(p-tBuPh)-Ind)(2-Me-4-Ph-5-OMe-6-tBu-Ind)$ZrCl_2$ is used.

The ligands required to form the complexes and hence catalysts of the invention can be synthesised by any process and the skilled organic chemist would be able to devise various synthetic protocols for the manufacture of the necessary ligand materials. For Example WO 2007/116034 discloses the necessary chemistry. Synthetic protocols can also generally be found in WO 2002/02576, WO 2011/135004, WO 2012/084961, WO 2012/001052, WO 2011/076780, WO 2013/007650, WO 2015/158790 and WO 2018/122134. The examples section also provides the skilled person with sufficient direction.

Cocatalyst

To form an active catalytic species it is normally necessary to employ a cocatalyst as is well known in the art. Cocatalysts comprising one or more compounds of Group 13 metals, like organoaluminium compounds or boron containing cocatalysts or combinations therefrom used to activate metallocene catalysts are suitable for use in this invention.

In a preferred embodiment of the present invention a cocatalyst system comprising a boron containing cocatalyst, e.g. a borate cocatalyst and an aluminoxane cocatalyst is used.

The single-site polymerization catalyst system used in the invention therefore can comprise (i) a complex as defined above and an aluminoxane cocatalyst.

The aluminoxane cocatalyst can be one of formula (VI):

(VI)

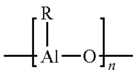

where n is from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, $C_1$-$C_{10}$-alkyl, preferably $C_1$-$C_5$-alkyl, or $C_3$-$C_{10}$-cycloalkyl, $C_7$-$C_{12}$-arylalkyl or -alkylaryl and/or phenyl or naphthyl, and where Y can be hydrogen, halogen, preferably chlorine or bromine, or $C_1$-$C_{10}$-alkoxy, preferably methoxy or ethoxy. The resulting oxygen-containing aluminoxanes are not in general pure compounds but mixtures of oligomers of the formula (II).

The preferred aluminoxane is methylaluminoxane (MAO).

Since the aluminoxanes used according to the invention as cocatalysts are not, owing to their mode of preparation, pure compounds, the molarity of aluminoxane solutions hereinafter is based on their aluminium content.

According to the present invention, also a boron containing cocatalyst can be used. Boron containing cocatalysts of interest include those of formula (VII)

$$BY_3 \quad (VII)$$

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are fluorine, trifluoromethyl, aromatic fluorinated groups such as p-fluorophenyl, 3,5-difluorophenyl, pentafluorophenyl, 3,4,5-trifluorophenyl and 3,5-di(trifluoromethyl) phenyl. Preferred options are trifluoroborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris(3,5-difluorophenyl)borane and/or tris (3,4,5-trifluorophenyl)borane.

Particular preference is given to tris(pentafluorophenyl) borane.

However it is preferred that as a boron containing cocatalyst borates are used, i.e. compounds containing a borate.

These compounds generally contain an anion of formula:

$$(Z)_4B^- \quad (VIII)$$

where Z is an optionally substituted phenyl derivative, said substituent being a halo-$C_{1-6}$-alkyl or halo group. Preferred options are fluoro or trifluoromethyl. Most preferably, the phenyl group is perfluorinated.

Such ionic cocatalysts preferably contain a weakly-coordinating anion such as tetrakis(pentafluorophenyl)borate or tetrakis(3,5-di(trifluoromethyl)phenyl)borate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium.

Preferred ionic compounds which can be used according to the present invention include:

tributylammoniumtetra(pentafluorophenyl)borate,
tributylammoniumtetra(trifluoromethylphenyl)borate,
tributylammoniumtetra(4-fluorophenyl)borate,
N,N-dimethylcyclohexylammoniumtetrakis(pentafluorophenyl)borate,
N,N-dimethylbenzylammoniumtetrakis(pentafluorophenyl) borate,
N,N-dimethylaniliniumtetrakis(pentafluorophenyl)borate,
N,N-di(propyl)ammoniumtetrakis(pentafluorophenyl)borate,
di(cyclohexyl)ammoniumtetrakist(pentafluorophenyl)borate,
triphenylcarbeniumtetrakis(pentafluorophenyl)borate,
or ferroceniumtetrakis(pentafluorophenyl)borate.

Preference is given to triphenylcarbeniumtetrakis(pentafluorophenyl) borate,
N,N-dimethylaniliniumtetrakis(pentafluorophenyl)borate,
N,N-dimethylcyclohexylammoniumtetrakis(pentafluorophenyl)borate or
N,N-dimethylbenzylammoniumtetrakis(pentafluorophenyl) borate According to the present invention it is especially preferred to use an aluminoxane cocatalyst, like MAO, together with a boron containing cocatalyst, like borate cocatalyst.

Suitable amounts of co-catalyst will be well known to the skilled person.

Preferably, the amount of cocatalyst is chosen to reach below defined molar ratios. The molar ratio of feed amounts of boron (B) to the metal ion (M) (preferably zirconium) of the metallocene boron/M may be in the range 0.1:1 to 10:1 mol/mol, preferably 0.3:1 to 7:1, especially 0.3:1 to 5:1 mol/mol.

Even more preferably, the molar ratio of feed amounts of boron (B) to metal ion (M) (preferably zirconium) of the metallocene boron/M is from 0.3:1 to 3:1

The molar ratio of Al from the aluminoxane to the metal ion (M) (preferably zirconium) of the metallocene Al/M may be in the range 1:1 to 2000:1 mol/mol, preferably 10:1 to 1000:1, and more preferably 50:1 to 600:1 mol/mol.

Additives

The inventive ethylene-propylene-1-butene terpolymer can optionally comprise one or more additives in a total amount of from 0.1 up to 5.0 wt.-%, based on based on the overall weight of the ethylene-propylene-1-butene terpolymer, selected from the group comprising slip agents, anti-block agents, UV stabilizers, antistatic agents, alpha-nucleating agents and antioxidants.

Such additives are commonly known to an art skilled person.

Slip agents are also commonly known in the art. Slip agents migrate to the surface and act as lubricants polymer to polymer and polymer against metal rollers, giving reduced coefficient of friction (CoF) as a result. Examples are fatty acid amids, like erucamide (CAS No. 112-84-5), oleamide (CAS No. 301-02-0), stearamide (CAS No. 124-26-5) or combinations thereof.

Examples of antioxidants which are commonly used in the art, are sterically hindered phenols (such as CAS No. 6683-19-8, also sold as Irganox 1010 FF™ by BASF), phosphorous based antioxidants (such as CAS No. 31570-04-4, also sold as Hostanox PAR 24 (FF)™ by Clariant, or Irgafos 168 (FF)™ by BASF), sulphur based antioxidants (such as CAS No. 693-36-7, sold as Irganox PS-802 FL™ by BASF), nitrogen-based antioxidants (such as 4,4'-bis(1,1'-dimethylbenzyl)diphenylamine), or antioxidant blends.

Acid scavengers are also commonly known in the art. Examples are calcium stearate (CAS No. 1592-23-0), zinc stearate (CAS No. 557-05-1), sodium stearate, magnesium and zinc oxides, synthetic hydrotalcite (e.g. SHT, CAS No. 11097-59-9), lactates and lactylates.

Common antiblocking agents are natural silica such as diatomaceous earth (such as CAS No. 60676-86-0 (SuperfFloss™), CAS No. 60676-86-0 (SuperFloss E™), or CAS No. 60676-86-0 (Celite 499™)), synthetic silica (such as CAS No. 7631-86-9, CAS No. 7631-86-9, CAS No. 7631-86-9, CAS No. 7631-86-9, CAS No. 7631-86-9, CAS No. 7631-86-9, CAS No. 112926-00-8, CAS No. 7631-86-9, or CAS No. 7631-86-9), silicates (such as aluminium silicate, kaolin, CAS No. 1318-74-7, sodium aluminum silicate CAS No. 1344-00-9, calcined kaolin CAS No. 92704-41-1, aluminum silicate CAS No. 1327-36-2, or calcium silicate CAS No. 1344-95-2), synthetic zeolites (such as sodium calcium aluminosilicate hydrate CAS No. 1344-01-0, CAS No. 1344-01-0, or sodium calcium aluminosilicate, hydrate CAS No. 1344-01-0).

Suitable UV-stabilisers are, for example, Bis-(2,2,6,6-tetramethyl-4-piperidyl)-sebacate (CAS No. 52829-07-9, Tinuvin 770); 2-hydroxy-4-n-octoxy-benzophenone (CAS No. 1843-05-6, Chimassorb 81).

Alpha nucleating agents like sodium benzoate (CAS No. 532-32-1); a mixture of aluminium-hydroxy-bis[2,2'-methylene-bis(4,6-di-t-butylphenyl)phosphate] and lithium myristate (commercially available as Adekastab NA-21 of Adeka Palmarole, France) or 1,3:2,4-bis(3,4-dimethylbenzylidene)sorbitol (CAS No. 135861-56-2, commercially available as Millad 3988 of Milliken, USA) can also be added.

Suitable antistatic agents are, for example, glycerol esters (CAS No. 97593-29-8) or ethoxylated amines (CAS No. 71786-60-2 or 61791-31-9) or ethoxylated amides (CAS No. 204-393-1).

Usually these additives are added in quantities of 100-1.000 ppm for each single component.

Preferably, at least one antioxidant is added.

Polymerization Process

Polymerization processes which are suitable for producing the terpolymer generally comprise at least two polymerization stages and each stage can be carried out in solution, slurry, fluidized bed, bulk or gas phase.

The term "polymerization reactor" shall indicate that the main polymerization takes place. Thus in case the process consists of one or two polymerization reactors, this definition does not exclude the option that the overall system comprises for instance a pre-polymerization step in a pre-polymerization reactor. The term "consist of" is only a closing formulation in view of the main polymerization reactors.

The term "sequential polymerization process" indicates that the terpolymer is produced in at least two reactors connected in series. Accordingly, such a polymerization system comprises at least a first polymerization reactor (R1) and a second polymerization reactor (R2).

The first polymerization reactor (R1) is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention, the slurry reactor is preferably a (bulk) loop reactor.

The second polymerization reactor (R2) and are preferably gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

A preferred multistage process is a "loop-gas phase"-process, such as developed by Borealis (known as BORSTAR® technology) described e.g. in patent literature, such as in EP 0 887 379, WO 92/12182, WO 2004/000899, WO 2004/111095, WO 99/24478, WO 99/24479 or in WO 00/68315.

A prepolymerization as known in the art can be present and is preferred.

Preferably, in the instant process for producing the terpolymer as defined above the conditions for the first reactor (R1), i.e. the slurry reactor (SR), like a loop reactor (LR), of step (a) may be as follows:

- the temperature is within the range of 65° C. and 75° C.,
- the pressure is within the range of 4500 to 5500 kPa,
- hydrogen can be added for controlling the molar mass in a manner known per se.

Subsequently, the reaction mixture of the first reactor (R1) is transferred to the second reactor (R2), i.e. gas phase reactor (GPR1), where the conditions are preferably as follows:

- the temperature is within the range of 70° C. to 80° C.,
- the pressure is within the range of 2000 to 3000 kPa and
- hydrogen can be added for controlling the molar mass in a manner known per se.

Suitable ratios for C2/C3 and C4/C3 are shown in the examples.

EXPERIMENTAL PART

A. Measuring Methods

The following definitions of terms and determination methods apply for the above general description of the invention as well as to the below examples unless otherwise defined.

a) $MFR_2$ (230° C.) was measured according to ISO 1133 (230° C., 2.16 kg load).

b) Quantification of microstructure by NMR spectroscopy

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Avance III 500 NMR spectrometer operating at 500.13 and 125.76 MHz for 1H and $^{13}C$ respectively. All spectra were recorded using a $^{13}C$ optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {klimke06, parkinson07, castignolles09}. Standard single-pulse excitation was employed utilising the NOE at short recycle delays of 3 s {pollard04, klimke06} and the RS-HEPT decoupling scheme {fillip05, griffin07}. A total of 1024 (1 k) transients were acquired per spectra.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm. Characteristic signals corresponding to the incorporation of 1-butene were observed {brandolini01} and the comonomer content quantified.

The amount of isolated 1-butene incorporated in PBP sequences was quantified using the integral of the αB2 sites at 43.6 ppm accounting for the number of reporting sites per comonomer:

$$B = I_{\alpha B2}/2$$

The amount of consecutively incorporated 1-butene in PBBP sequences was quantified using the integral of the ααB2B2 site at 40.5 ppm accounting for the number of reporting sites per comonomer:

$$BB = 2 * I_{\alpha\alpha B2B2}$$

In presence of BB the value of B must be corrected for the influence of the αB2 sites resulting from BB:

$$B = (I_{\alpha B2}/2) - BB/2$$

The total 1-butene content was calculated based on the sum of isolated and consecutively incorporated 1-butene:

$$B_{total} = B + BB$$

Characteristic signals corresponding to the incorporation of ethylene were observed {brandolini01} and the comonomer content quantified.

The amount of isolated ethylene incorporated in PEP sequences was quantified using the integral of the SBB sites at 24.3 ppm accounting for the number of reporting sites per comonomer:

$$E = I_{S\beta\beta}$$

If characteristic signals corresponding to consecutive incorporation of ethylene in PEE sequence was observed the Sβδ site at 27.0 ppm was used for quantification:

$$EE = I_{S\beta\delta}$$

Characteristic signals corresponding to regio defects were observed {resconi00}.

The presence of isolated 2,1-erythro regio defects was indicated by the presence of the two methyl sites at 17.7 and 17.2 ppm, by the methylene site at 42.4 ppm and confirmed by other characteristic sites. The presence of 2,1 regio defect adjacent an ethylene unit was indicated by the two inequivalent Sαβ signals at 34.8 ppm and 34.4 ppm respectively and the Tγγ at 33.7 ppm.

The amount of isolated 2,1-erythro regio defects ($P_{21e\ isolated}$) was quantified using the integral of the methylene site at 42.4 ppm ($I_{e9}$):

$$P_{21e\ isolated} = I_{e9}$$

If present the amount of 2,1 regio defect adjacent to ethylene ($P_{E21}$) was quantified using the methine site at 33.7 ppm ($I_{T\gamma\gamma}$):

$$P_{E21} = I_{T\gamma\gamma}$$

The total ethylene content was then calculated based on the sum of ethylene from isolated, consecutively incorporated and adjacent to 2,1 regio defects:

$$E_{total} = E + EE + P_{E21}$$

The amount of propene was quantified based on the Sαα methylene sites at 46.7 ppm including all additional propene units not covered by Sαα e.g. the factor $3*P_{21e\ isolated}$ accounts for the three missing propene units from isolated 2,1-erythro regio defects:

$$P_{total} = I_{S\alpha\alpha} + 3^{*}P_{21e\ isolated} + B + 0.5^{*}BB + E + 0.5^{*}EE + 2^{*}P_{E21}$$

The total mole fraction of 1-butene and ethylene in the polymer was then calculated as:

$$fB = B_{total}/(E_{total} + P_{total} + B_{total})$$

$$fE = E_{total}/(E_{total} + P_{total} + B_{total})$$

The mole percent comonomer incorporation was calculated from the mole fractions:

$$B[\text{mol }\%] = 100 * fB$$

$$E[\text{mol }\%] = 100 * fE$$

The weight percent comonomer incorporation was calculated from the mole fractions:

$$B[wt.-\%] = 100 * (fB * 56.11)/((fE * 28.05) + (fB * 56.11) + ((1 - (fE + fB)) * 42.08))$$

$$E[wt.-\%] = 100 * (fE * 28.05)/((fE * 28.05) + (fB * 56.11) + ((1 - (fE + fB)) * 42.08))$$

The mole percent of isolated 2,1-erythro regio defects was quantified with respect to all propene:

$$[21e]\ \text{mol }\% = 100 * P_{21e\ isolated}/P_{total}$$

The mole percent of 2,1 regio defects adjacent to ethylene was quantified with respect to all propene:

$$[E21]\ \text{mol }\% = 100 * P_{E21}/P_{total}$$

The total amount of 2,1 defects was quantified as following:

$$[21]\ \text{mol}\ \% = [21e] + [E21]$$

Characteristic signals corresponding to other types of regio defects (2,1-threo, 3,1 insertion) were not observed {resconi00}.

Literature (as Referred to Above):

| | |
|---|---|
| klimke06 | Klimke, K., Parkinson, M., Piel, C., Kaminsky, W., Spiess, H. W., Wilhelm, M., Macromol. Chem. Phys. 2006; 207: 382. |
| parkinson07 | Parkinson, M., Klimke, K., Spiess, H. W., Wilhelm, M., Macromol. Chem. Phys. 2007; 208: 2128. |
| pollard04 | Pollard, M., Klimke, K., Graf, R., Spiess, H. W., Wilhelm, M., Sperber, O., Piel, C., Kaminsky, W., Macromolecules 2004; 37: 813. |
| filip05 | Filip, X., Tripon, C., Filip, C., J. Mag. Resn. 2005, 176, 239 |
| griffin07 | Griffin, J. M., Tripon, C., Samoson, A., Filip, C., and Brown, S. P., Mag. Res. in Chem. 2007 45, S1, S198. |
| castignolles09 | Castignolles, P., Graf, R., Parkinson, M., Wilhelm, M., Gaborieau, M., Polymer 50 (2009) 2373. |
| resconi00 | Resconi, L., Cavallo, L., Fait, A., Piemontesi, F., Chem. Rev. 2000, 100, 1253. |
| brandolini01 | A. J. Brandolini, D.D. Hills, "NMR spectra of polymers and polymer additives", Marcel Deker Inc., 2000 |

c) DSC analysis, melting temperature (Tm) and crystallization temperature (Tc)

was measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30° C. to +225° C. Crystallization temperature (Tc) and crystallization enthalpy (Hc) were determined from the cooling step, while melting temperature (Tm) and melting enthalpy (Hm) were determined from the second heating step.

d) Haze was determined according to ASTM D1003-00 on the blown test films of 50 micrometer thickness.

e) Sealing initiation temperature (SIT); sealing end temperature (SET),

Sealing initiation temperature (SIT); sealing end temperature (SET), sealing range: The method determines the sealing temperature range (sealing range) of polypropylene films, in particular blown films or cast films according to ASTM F1921-12. Seal pressure, cool time and peel speed were modified as stated below.

The sealing temperature range is the temperature range, in which the films can be sealed according to conditions given below.

The lower limit (heat sealing initiation temperature (SIT)) is the sealing temperature at which a sealing strength of >5 N is achieved. The upper limit (sealing end temperature (SET)) is reached, when the films stick to the sealing device.

The sealing range was determined on a J&B Universal Sealing Machine Type 3000 with a blown film of 50 μm thickness with the following further parameters:

Specimen width: 25.4 mm

Seal Pressure: 0.1 N/mm$^2$

Seal Time: 0.1 sec

Cool time: 99 sec

Peel Speed: 10 mm/sec

Start temperature: 80° C.

End temperature: 150° C.

Increments: 10° C.

Specimen was sealed A to A at each sealbar temperature and seal strength (force) was determined at each step.

The temperature was determined at which the seal strength reaches 5 N.

f) Tensile Modulus

Tensile Modulus of film in machine and transverse direction were determined according to ISO 527-3 at 23° C. on blown films of 50 μm thickness.

The modulus of the modifier was determined according to ASTM D638. The speed used for modulus detection was 0.6 mm/min, and 5 mm/min for elongation at break.

g) Dart drop strength (DDI) also called dart drop impact

Dart-drop was measured using ASTM D1709, method A (Alternative Testing Technique) from the film samples. A dart with a 38 mm diameter hemispherical head was dropped from a height of 0.66 m onto a film clamped over a hole. Successive sets of twenty specimens were tested. One weight was used for each set and the weight was increased (or decreased) from set to set by uniform increments. The weight resulting in failure of 50% of the specimens was calculated and reported.

h) Xylene cold solubles (XCS, wt.-%):

Content of xylene cold solubles (XCS) was determined at 25° C. according ISO 16152; 2005.

i) Tear resistance (determined as Elmendorf tear (N) in machine (MD) and transverse (TD) direction:

The tear strength was measured using the ISO 6383/2 method. The force required to propagate tearing across a film sample was measured using a pendulum device. The pendulum swings under gravity through an arc, tearing the specimen from pre-cut slit. The specimen was fixed on one side by the pendulum and on the other side by a stationary clamp. The tear resistance is the force required to tear the specimen. The relative tear resistance (N/mm) is then calculated by dividing the tear resistance by the thickness of the film.

B. Examples

Preparation of the first catalyst system for the ethylene-propene-butene terpolymer base resin.

The metallocene (MC1) (rac-anti-dimethylsilandiyl(2-methyl-4-phenyl-5-methoxy-6-tert-butyl-indenyl)(2-methyl-4-(4-tert-butylphenyl)indenyl)zirconium dichloride)

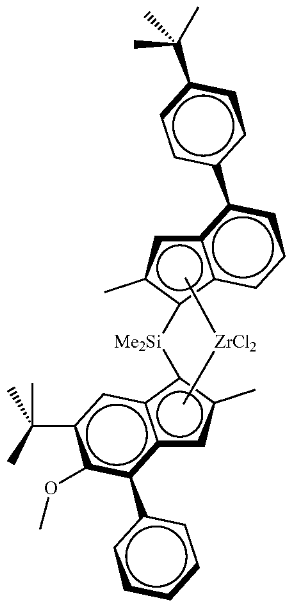

has been synthesized as described in WO 2013/007650.

Preparation of MAO-Silica Support

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (7.4 kg) was added from a feeding drum followed by careful pressuring and depressurising with nitrogen using manual valves. Then toluene (32 kg) was added. The mixture was stirred for 15 min. Next 30 wt % solution of MAO in toluene (17.5 kg) from Lanxess was added via feed line on the top of the reactor within 70 min. The reaction mixture was then heated up to 90° C. and stirred at 90° C. for additional two hours. The slurry was allowed to settle and the mother liquor was filtered off. The MAO treated support was washed twice with toluene (32 kg) at 90° C., following by settling and filtration. The reactor was cooled off to 60° C. and the solid was washed with heptane (32.2 kg). Finally MAO treated $SiO_2$ was dried at 60° under nitrogen flow for 2 hours and then for 5 hours under vacuum (−0.5 barg) with stirring. MAO treated support was collected as a free-flowing white powder found to contain 12.6% Al by weight.

Catalyst System Preparation 30 wt % MAO in toluene (2.2 kg) was added into a steel nitrogen blanked reactor via a burette at 20° C. Toluene (7 kg) was then added under stirring. Metallocene MC1 (286 g) was added from a metal cylinder followed by flushing with 1 kg toluene. The mixture was stirred for 60 minutes at 20° C. Trityl tetrakis(pentafluorophenyl) borate (336 g) was then added from a metal cylinder followed by a flush with 1 kg of toluene. The mixture was stirred for 1 h at room temperature. The resulting solution was added to a stirred cake of MAO-silica support prepared as described above over 1 hour. The cake was allowed to stay for 12 hours, followed by drying under N2 flow at 60° C. for 2 h and additionally for 5 h under vacuum (−0.5 barg) under stirring. Dried catalyst was sampled in the form of pink free flowing powder containing 13.9 wt % Al and 0.26 wt % Zr Polymerization and Pelletization Terpolymer IE1 and Copolymer CE2 were produced in a Borstar pilot plant comprising a prepolymerization reactor, one loop reactor and a gas phase reactor coupled in series using above described catalyst system. The polymerization conditions are indicated in Table 1

TABLE 1

Polymerization process conditions for IE1 (terpolymer base resin) and CE2

| | ethylene-propene-butene terpolymer base resin C2C3C4 terpo (IE1) | ethylene-propene-copolymer base resin C2C3 copo (CE2) |
|---|---|---|
| Prepolymerization reactor | | |
| Temp. (° C.) | 20 | 25 |
| Press. (kPa) | 4973 | 5157 |
| Residence time (h) | 0.8 | 0.40 |
| loop reactor | | |
| Temp. (° C.) | 70 | 68 |
| Press. (kPa) | 4864 | 5397 |
| Feed H2/C3 ratio (mol/kmol) | 0.1 | 0.3 |
| Feed C2/C3 ratio (mol/kmol) | 16.1 | 48.3 |
| Feed C4/C3 ratio (mol/kmol) | 25.4 | 0 |
| Polymer Split (wt.-%) [amount produced in loop reactor] | 41 | 74 |
| MFR2 (g/10 min) | 2 | 1.5 |
| Total C2 (wt.-%) | 1.0 | 4.8 |
| Total C4 (wt.-%) | 5.5 | 0 |
| nature of polymer produced in loop | C3C2C4 terpolymer | C3C2 copolymer |
| Gas phase reactor | | |
| Temp. (° C.) | 75 | 75 |
| Press. (kPa) | 2441 | 2500 |
| H2/C3 ratio (mol/kmol) | 1.5 | 3.0 |
| C2/C3 ratio (mol/kmol) | 120.8 | 215 |
| C4/C3 ratio (mol/kmol) | 61 | 0 |
| Polymer Split [gas phase reactor] (wt.-%) | 59 | 26 |
| nature of polymer produced in gas phase reactor | C3C2C4 terpolymer | C3C2 copolymer |
| nature of resulting polymer in-situ blend | C3C2C4 terpolymer + C3C2C4 terpolymer mixture | C3C2 copolymer + C3C2 copolymer mixture |
| Pellet | | |
| $MFR_2$ (g/10 min) | 2.1 | 1.2 |
| Tm (° C.) | 129 | 118 |
| Tc (° C.) | 91 | 79 |
| C2 (wt.-%) | 1.5 | 4.6 |
| C4 (wt.-%) | 6.6 | 0 |
| C2 + C4 (wt.-%) | 8.1 | 4.6 |
| Ratio C4/C2 (wt.-%/wt.-%) | 4.4 | 0 |
| 2.1 (mol %) | 0.26 | 0.28 |
| XCS (wt.-%) | 17.1 | 7.9 |

Both polymer powders were compounded in a co-rotating twin-screw extruder Coperion ZSK 57 at 220° C. with 0.1 wt.-% antiblock agent (synthetic silica; CAS-no. 7631-86-9); 0.05 wt.-% antioxidant (Irgafos 168FF); 0.1 wt.-% of a sterical hindered phenol (Irganox 1010FF); 0.04 wt.-% of DHT-4A (CAS-no. 11097-59-9, Kisuma Chemicals).

Tafmer XM7080 was used as the propylene butene random copolymer upgrading resin. Tafmer XM7080 has a content of units derived from butene of 26.2 wt.-%, an $MFR_2$ of 6 g/10 min, a melting temperature Tm of 87° C„ a tensile modulus (ASTM D638) of 249 MPa, tensile strength at break (ASTM D638) of 20.2 MPa, and an elongation at break of 393%. Shore D hardness (ASTM D2240) is 55.

Blown Film Production

Films were produced on a Collin 30 lab scale blown film line. Film thickness was 50 microns and BUR was 1:2.5. The melt temperature was 215° C., uptake speed is 6.2 m/min.

The characteristics of the polypropylene compositions and the results of the films are provided below in table 2.

TABLE 2

Characteristics of the polypropylene compositions and the results of the films

| | | IE1 | IE2 | CE1 | CE2 | CE3 |
|---|---|---|---|---|---|---|
| C2C3C4 terpo | wt.-% | 90 | 75 | 100 | | |
| C2C3 copo | wt.-% | | | | 100 | 90 |
| Tafmer XM7080 | wt.-% | 10 | 25 | | | 10 |
| TM/MD | MPa | 639 | 542 | 807 | 629 | 561 |
| TM/TD | MPa | 646 | 559 | 807 | 654 | 561 |
| Tear/MD | N/mm | 8.3 | 11.3 | 7.96 | 8.5 | n.m. |
| Tear/TD | N/mm | 18.39 | 23.39 | 16 | 20.25 | n.m. |
| Haze | % | 3.0 | 1.8 | 1.8 | 4.9 | 4.3 |
| SIT | ° C. | 105 | 96 | 110 | 104 | 101 |
| DDI | g | 64 | 110 | 54 | 56 | 68 |

As can be seen, blending the upgrading resin, i.e. the propylene butene copolymer with the terpolymer resulted in improved tear, SIT(below 106° C.) and DDI at only a moderate stiffness deterioration and still acceptable haze (below 3.5%). When comparative base resin CE2 (cf. above) was used, haze was not good and the balance of DDI and tensile modulus also turned out to be not favorable, i.e. the DDI was too low for the obtained stiffness.

It was surprisingly found that the combination of the terpolymer and the upgrading resin results in excellent low sealing initiation temperature (SIT) at a favorable DDI for the resulting (i.e. given) stiffness at simultaneously low haze, i.e. below the frequently accepted 3.5%.

The invention claimed is:

1. A film made from a blend obtainable by compounding an ethylene-propylene-1-butene terpolymer base resin and a propylene butene random copolymer upgrading resin, wherein the ethylene-propylene-1-butene terpolymer base resin includes a) units derived from ethylene in an amount of 0.1 to 2.0 wt.-% with respect the total ethylene-propylene-1-butene terpolymer base resin; and b) units derived from propylene in an amount of 88.0 to 95.9 wt.-% with respect the total ethylene-propylene-1-butene terpolymer base resin; and c) units derived from butene in an amount of 4.0 to 10.0 wt.-% with respect the total ethylene-propylene-1-butene terpolymer base resin, d) wherein the units derived from ethylene, propylene and butene add up to 100 wt.-%, and wherein the ethylene-propylene-1-butene terpolymer base resin has e) 2.1 regioinversions in an amount of 0.10 to 0.80 mol % as determined by $^{13}C$-NMR analysis, wherein the 2.1 regioinversions are the sum of 2.1-erythro regio defects and 2.1 regio defects adjacent to ethylene; and f) a melt flow rate $MFR_2$ (230° C./2.16 kg) measured according to ISO 1133 in the range from 1.0 to 18.0 g/10 min, and g) a melting temperature Tm measured by differential scanning calorimetry (DSC) in the range from 123 to 142° C.; and wherein the propylene butene random copolymer upgrading resin has h) a melting temperature Tm measured by differential scanning calorimetry (DSC) in the range from 70 to 90° C., and i) units derived from butene in an amount of 20.0 to 35.0 wt.-% with respect the total propylene butene random copolymer upgrading resin, j) wherein the units derived from propylene and butene add up to 100 wt.-%, and k) a melt flow rate $MFR_2$ (230° C./2.16 kg) measured according to ISO 1133 of 1.0 to 18.0 g/10 min; and l) optionally an elongation at break (ASTM D638) of 100 to 900%, wherein the film has a sealing initiation temperature (SIT) according to ASTM F1921-12 below 106° C., and wherein the ethylene-propylene-1-butene terpolymer base resin is bimodal as to the units derived from 1-butene and/or is bimodal as to the molecular weight.

2. The film according to claim 1, made from a blend obtainable by compounding an ethylene-propylene-1-butene terpolymer base resin and a propylene butene random copolymer upgrading resin, wherein the ethylene-propylene-1-butene terpolymer base resin includes a) units derived from ethylene in an amount 0.5 to 1.9 wt.-% with respect the total ethylene-propylene-1-butene terpolymer base resin; and b) units derived from propylene in an amount of 90.1 to 95.0 wt.-% with respect the total ethylene-propylene-1-butene terpolymer base resin; and c) units derived from butene in an amount of 4.5 to 8.0 wt.-% with respect the total ethylene-propylene-1-butene terpolymer base resin, d) wherein the units derived from ethylene, propylene and butene add up to 100 wt.-%, and e) a total amount of units derived from ethylene and butene of 6.0 to 9.0 wt.-% with respect the total ethylene-propene-butene terpolymer base resin, and f) a ratio of the units derived from butene in weight percent versus the units derived from ethylene in weight percent of 3.0 to 16.0;

wherein the ethylene-propylene-1-butene terpolymer base resin has g) 2.1 regioinversions in an amount of 0.20 to 0.50 mol % as determined by $^{13}C$-NMR analysis, wherein the 2.1 regioinversions are the sum of 2.1-erythro regio defects and 2.1 regio defects adjacent to ethylene; and h) a melt flow rate $MFR_2$ (230° C./2.16 kg) measured according to ISO 1133 in the range from 1.5 to 7.0 g/10 min, and i) a melting temperature Tm measured by differential scanning calorimetry (DSC) in the range from 125 to 135° C.; and wherein the propylene butene random copolymer upgrading resin has j) a melting temperature Tm measured by differential scanning calorimetry (DSC) in the range from 70 to 90° C., and k) units derived from butene in an amount of 20.0 to 35.0 wt.-% with respect the total propylene butene random copolymer upgrading resin, and l) wherein the units derived from propylene and butene add up to 100 wt.-%, and m) a melt flow rate $MFR_2$ (230° C./2.16 kg) measured according to ISO 1133 in the range of 1.0 to 18.0 g/10 min; and p) optionally an elongation at break (ASTM D638) of 100 to 900%.

3. The film according to claim 1, wherein the propylene butene random copolymer upgrading resin has one or more of the following properties:

o) a tensile strength at break (ASTM D638) of at least 15 MPa, p) a tensile modulus (according to ASTM D638) of least 200 MPa;

q) a shore D hardness (ASTM D2240) of at least 55;

r) a melting temperature Tm measured by differential scanning calorimetry (DSC) in the range from 81 to 90° C.

4. The film according to claim 1, wherein the ethylene-propylene-1-butene terpolymer base resin has 2.1 regioinversions in an amount of 0.20 to 0.35 mol % as determined by $^{13}C$-NMR analysis, wherein the 2.1 regioinversions are the sum of 2.1-erythro regio defects and 2.1 regio defects adjacent to ethylene.

5. The film according to claim 1, wherein the ethylene-propylene-1-butene terpolymer base resin is present in an amount of 70 to 95 wt.-% with respect to the total blend and wherein the propylene butene random copolymer upgrading resin is present in an amount of 5 to 30 wt.-% with respect to the total blend, wherein ethylene-propylene-1-butene terpolymer base resin and propylene butene random copolymer upgrading resin add up to at least 98 wt.-% up to 100 wt.-% of the film.

6. The film according to claim 1, wherein haze determined according to ASTM D1003-00 on a test film having a thickness of 50 micrometre is below 3.5%.

7. The film according to claim 1, wherein the ethylene-propylene-1-butene terpolymer base resin has a xylene soluble content of 15.0 to 19.0 wt.-% determined at 25° C. according ISO 16152; 2005.

8. A blend obtainable by compounding an ethylene-propylene-1-butene terpolymer base resin and a propylene butene random copolymer upgrading resin, wherein the ethylene-propylene-1-butene terpolymer base resin includes a) units derived from ethylene in an amount of 0.1 to 2.0 wt.-% with respect the total ethylene-propene-butene terpolymer base resin; and b) units derived from propylene in an amount of 88.0 to 95.9 wt.-% with respect the total ethylene-propene-butene terpolymer base resin; and c) units derived from butene in an amount of 4.0 to 10.0 wt.-% with respect the total ethylene-propene-butene terpolymer base resin, d) wherein the units derived from ethylene, propylene and butene add up to 100 wt.-%, and wherein the ethylene-propene-butene terpolymer base resin has e) 2.1 regioinversions in an amount of 0.10 to 0.80 mol-% as determined by $^{13}C$-NMR analysis, wherein the 2.1 regioinversions are the sum of 2.1-erythro regio defects and 2.1 regio defects adjacent to ethylene; and f) a melt flow rate $MFR_2$ (230° C./2.16 kg) measured according to ISO 1133 in the range from 1.0 to 18.0 g/10 min, and g) a melting temperature Tm measured by differential scanning calorimetry (DSC) in the range from 123 to 142° C.; and wherein the propylene butene random copolymer upgrading resin has h) a melting temperature Tm measured by differential scanning calorimetry (DSC) in the range from 70 to 90° C., and i) units derived from butene in an amount of 20.0 to 35.0 wt.-%, with respect the total propylene butene random copolymer upgrading resin, j) wherein the units derived from propylene and butene add up to 100 wt.-%, and k) a melt flow rate $MFR_2$ (230° C./2.16 kg) measured according to ISO 1133 in the range of 1.0 to 18.0 g/10 min; and l) optionally an elongation at break (ASTM D638) of 100 to 900%, and wherein the ethylene-propylene-1-butene terpolymer base resin is bimodal as to the units derived from 1-butene and/or bimodal as to the molecular weight.

9. The blend according to claim 8, obtainable by compounding an ethylene-propylene-1-butene terpolymer base resin and a propylene butene random copolymer upgrading resin, wherein the ethylene-propylene-1-butene terpolymer base resin includes a) units derived from ethylene in an amount 0.5 to 1.9 wt.-% with respect the total ethylene-propene-butene terpolymer base resin; and b) units derived from propylene in an amount of 90.1 to 95.0 wt.-% with respect the total ethylene-propene-butene terpolymer base resin; and c) units derived from butene in an amount of 4.5 to 8.0 wt.-% with respect the total ethylene-propene-butene terpolymer base resin, d) wherein the units derived from ethylene, propylene and butene add up to 100 wt.-%, and e) a total amount of units derived from ethylene and butene of 6.0 to 9.0 wt.-% with respect the total ethylene-propene-butene terpolymer base resin, and f) a ratio of the units derived from butene in weight percent versus the units derived from ethylene in weight percent of 3.0 to 16.0;

wherein the ethylene-propene-butene terpolymer base resin has g) 2.1 regioinversions in an amount of 0.20 to 0.50 mol % as determined by $^{13}C$-NMR analysis, wherein the 2.1 regioinversions are the sum of 2.1-erythro regio defects and 2.1 regio defects adjacent to ethylene (as described in the experimental part); and h) a melt flow rate $MFR_2$ (230° C./2.16 kg) measured according to ISO 1133 in the range from 1.5 to 7.0 g/10 min, and i) a melting temperature Tm measured by differential scanning calorimetry (DSC) in the range from 125 to 135° C.;

and wherein the propylene butene random copolymer upgrading resin has j) a melting temperature Tm measured by differential scanning calorimetry (DSC) in the range from 70 to 90° C., and k) units derived from butene in an amount of 22.0 to 29.0 wt.-% with respect the total propylene butene random copolymer upgrading resin, l) wherein the units derived from propylene and butene add up to 100 wt.-%, and m) a melt flow rate $MFR_2$ (230° C./2.16 kg) measured according to ISO 1133 in the range of 1.0 to 18.0 g/10 min; and n) optionally an elongation at break (ASTM D638) of 100 to 900%.

10. The blend according to claim 8, wherein the propylene butene random copolymer upgrading resin has one or more of the following:

o) a tensile strength at break (ASTM D638) of at least 15 MPa, p) a tensile modulus of least 250 MPa, measured according to ASTM D638;

q) a shore D hardness (ASTM D2240) of at least 55;

r) a melting temperature Tm measured by differential scanning calorimetry (DSC) in the range from 81 to 90° C.

11. The blend according to claim 8, wherein the ethylene-propylene-1-butene terpolymer base resin has 2.1 regioinversion in an amount of 0.20 to 0.35 mol % as determined by $^{13}C$-NMR analysis, wherein the 2.1 regioinversions are the sum of 2.1-erythro regio defects and 2.1 regio defects adjacent to ethylene.

12. The blend according to claim 8, wherein the ethylene-propylene-1-butene terpolymer base resin is present in an amount of 70 to 95 wt.-% with respect to the total blend and wherein the propylene butene random copolymer upgrading resin is present in an amount of 5 to 30 wt.-% with respect to the total blend, wherein ethylene-propylene-1-butene terpolymer base resin and propylene butene random copolymer upgrading resin add up to at least 98 wt.-%, particularly 100 wt.-% of the total blend.

13. The blend according to claim 8, wherein the ethylene-propylene-1-butene terpolymer base resin is present in an amount of 70 to less than 85 wt.-% with respect to the total blend and wherein the propylene butene random copolymer upgrading resin is present in an amount of more than 15 to 30 wt.-% with respect to the total blend.

* * * * *